United States Patent
Nyström et al.

(10) Patent No.: US 10,812,709 B2
(45) Date of Patent: Oct. 20, 2020

(54) OPERATION CONTROL OF BATTERY-POWERED DEVICES

(71) Applicant: Axis AB, Lund (SE)

(72) Inventors: Johan Nyström, Lund (SE); Kent Fransson, Lund (SE)

(73) Assignee: Axis AB, Lund (SE)

( * ) Notice: Subject to any disclaimer, the term of this patent is extended or adjusted under 35 U.S.C. 154(b) by 83 days.

(21) Appl. No.: 16/220,997

(22) Filed: Dec. 14, 2018

(65) Prior Publication Data

US 2019/0199923 A1 Jun. 27, 2019

(30) Foreign Application Priority Data

Dec. 21, 2017 (EP) .................................... 17209672

(51) Int. Cl.
| | | |
|---|---|---|
| *H04N 5/225* | (2006.01) | |
| *H04N 5/232* | (2006.01) | |
| *G06F 1/3234* | (2019.01) | |
| *H04N 7/18* | (2006.01) | |

(Continued)

(52) U.S. Cl.
CPC ....... *H04N 5/23241* (2013.01); *G06F 1/3203* (2013.01); *G06F 1/325* (2013.01); *H04N 5/23216* (2013.01); *H04N 5/23299* (2018.08); *H04N 7/18* (2013.01); *H04W 52/0254* (2013.01); *H04W 52/0225* (2013.01)

(58) Field of Classification Search
CPC .......... H04N 5/23241; H04N 5/23299; H04N 5/23216; H04N 7/18; G06F 1/3203; G06F 1/325; H04W 52/0254
USPC ....................................................... 348/372
See application file for complete search history.

(56) References Cited

U.S. PATENT DOCUMENTS

| | | | | |
|---|---|---|---|---|
| 5,745,126 A | * | 4/1998 | Jain ...................... | H04N 13/139 |
| | | | | 382/154 |
| 8,446,469 B2 | | 5/2013 | Blanco et al. | |
| 9,497,380 B1 | * | 11/2016 | Jannard .............. | H04N 5/23238 |

(Continued)

FOREIGN PATENT DOCUMENTS

| | | |
|---|---|---|
| EP | 2512121 B1 | 6/2013 |
| EP | 2600220 A2 | 6/2013 |
| WO | 2013/169623 A1 | 11/2013 |

OTHER PUBLICATIONS

Extended European Search Report dated Jun. 6, 2018 for the European Patent Application No. 17209672.9.

*Primary Examiner* — Usman A Khan
(74) *Attorney, Agent, or Firm* — Volpe and Koenig, P.C.

(57) ABSTRACT

A power control system for controlling operation of a first battery-powered device positioned at a remote location from a camera. The power control system includes a receiving module, a retrieving module, a comparison module, and a transmission module. The receiving module is configured to receive at least one of a pan angle and a tilt angle of the camera indicative of a field of view. The retrieving module is configured to retrieve a position of the first battery-powered device. The comparison module is configured to compare the pan angle and the tilt angle with the position of the first battery-powered device, and determine whether the first battery-powered device is positioned within the field of view of the camera based on the comparison. The transmission module is configured to transmit instructions to control power consumption of the first battery-powered device, based on the determination.

8 Claims, 6 Drawing Sheets

(51) Int. Cl.
*H04W 52/02* (2009.01)
*G06F 1/3203* (2019.01)

(56) References Cited

U.S. PATENT DOCUMENTS

| | | |
|---|---|---|
| 2006/0274166 A1 | 12/2006 | Lee et al. |
| 2007/0242839 A1 | 10/2007 | Kim et al. |
| 2013/0135196 A1 | 5/2013 | Park et al. |
| 2013/0300648 A1 | 11/2013 | Kim et al. |
| 2014/0361955 A1* | 12/2014 | Goncalves ............ G06F 1/3215 345/8 |

* cited by examiner

OPERATION CONTROL OF BATTERY-POWERED DEVICES

FIELD OF INVENTION

The present teachings relate to controlling operation of battery-powered devices and in particular, relates to systems and methods for controlling power consumption of the battery-powered devices positioned at a remote location from a camera.

BACKGROUND

Cameras, for example, Pan-Tilt-Zoom (PTZ) cameras are used for recording a video of events or activities occurring within a field-of-view. As the name suggests, a PTZ camera is configured to pan, tilt, and zoom in order to ensure a complete and useful recording of the events. Among several applications, such cameras may primarily be used for entertainment or security purposes. For recording the events, a camera usually operates in conjunction with one or more devices, such as microphones, temperature sensors, and light emitting equipment. The microphones may be used to record audio of the events being recorded by the camera. The temperature sensors may be used to support recording of temperature-sensitive activities. Similarly, the light emitting equipment may be used for illuminating area within the field-of-view to ensure recording of clearly visible videos. Such devices may either be integrated with the camera or be remotely positioned from the camera. In case of being remotely positioned, the devices may be in a wired or wireless communication with the camera.

Such remotely positioned devices are usually powered by in-built batteries. An operator may switch on the remotely positioned devices before the camera starts recording, and the remotely positioned devices are kept operational throughout the duration of the recording. Due to the continuous operation for hours, for example, in case of surveillance, the batteries of the remotely positioned devices have to be re-charged or replaced frequently. This would increase an operational cost of recording the events. Further, the operator may have to be frequently available in order to ensure the continuous operation of the remotely positioned devices. Moreover, frequent recharging or replacement of the batteries may pose inconvenience to the operator.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

In an embodiment, a power control system for controlling operation of a first battery-powered device positioned at a remote location from a camera is disclosed. The power control system includes a receiving module, a retrieving module, a comparison module, and a transmission module. The receiving module is configured to receive at least one of a pan angle and a tilt angle of the camera. The pan angle and the tilt angle are indicative of a field of view of the camera. The retrieving module is configured to retrieve a position of the first battery-powered device. The position of the first battery-powered device is predefined. The comparison module is in communication with the receiving module and the retrieving module. The comparison module is configured to compare the pan angle and the tilt angle with the position of the first battery-powered device, and determine whether the first battery-powered device is positioned within the field of view of the camera based on the comparison. Further, the transmission module is in communication with the comparison module. The transmission module is configured to transmit instructions to control power consumption of the first battery-powered device, based on the determination.

In another embodiment of the present disclosure, a method of controlling operation of at least one battery-powered device positioned at a remote location from a camera is disclosed. The method includes receiving, by a power control system, a pan angle and a tilt angle of the camera. The pan angle and the tilt angle are indicative of a field of view of the camera. Further, the method includes retrieving a position of the at least one battery-powered device. The position of the at least one battery-powered device is predefined. The method then includes comparing, by the power control system, the pan angle and the tilt angle with the position of the at least one battery-powered device. Furthermore, the method includes determining, by the power control system, whether the at least one battery-powered device is positioned within the field of view of the camera, based on the comparison. Subsequently, the method includes transmitting instructions to control power consumption of the at least one battery-powered device, based on the determination.

The power control system further includes the transmission module configured to transmit the instructions for activating at least one of a functional mode and a sleep mode of the first battery-powered device to control the power consumption.

The power control system further includes the transmission module configured to transmit an instruction to activate the sleep mode of the first battery-powered device, when the first battery-powered device is not positioned within the field of view of the camera, wherein the first battery-powered device does consume substantially no power in the sleep mode.

The power control system further includes the transmission module configured to transmit an instruction to activate the functional mode of the first battery-powered device, when the first battery-powered device is positioned within the field of view of the camera. The first battery-powered device consumes power in the functional mode.

The power control system further includes the retrieving module configured to retrieve a position of at least one object within the field of view to be recorded by the camera, and a position of a second battery-powered device positioned at a remote location from the camera. The position of the second battery-powered device is predefined.

The power control system further includes the comparison module configured to compare the pan angle and the tilt angle with positions of the first battery-powered device, the second battery-powered device, and the at least one object. The comparison module is configured to determine whether the first battery-powered device or the second battery-powered device is positioned closer to the at least one object while staying within the field of view of the camera, based on the comparison. The power control system further comprises the transmission module configured to transmit instructions to simultaneously control power consumption of the first battery-powered device and the second battery-powered device, based on the determination.

The power control system further includes the transmission module configured to transmit an instruction to activate the functional mode of first battery-powered device and a sleep mode of the second battery-powered device, when the first battery-powered device is positioned closer to the at least one object while staying within the field of view.

The first battery-powered device and the second battery-powered device include one of a temperature sensor, a micro-phone, and a light emitting unit.

The camera is a Pan-Tilt-Zoom (PTZ) camera.

In another embodiment of the present disclosure, a camera having a predefined field of view for recording activities occurring within the field of view is disclosed. The camera includes a first detection unit and a power control system in communication with at least one battery-powered device. The first detection unit is configured to detect a pan angle and a tilt angle of the camera while recording the activities. The pan angle and the tilt angle are indicative of the field of view. The power control system controls power consumption of the at least one battery-powered device. The power control system is configured to receive the pan angle and the tilt angle of the camera, and retrieve a position of the at least one battery-powered device. The position of the at least one battery-powered device is predefined. Further, the power control system is configured to compare the pan angle and the tilt angle with the position of the at least one battery-powered device. Furthermore, the power control system is configured to determine whether the at least one battery-powered device is positioned within the field of view of the camera, based on the comparison. Subsequently, the power control system is configured to transmit instructions to control power consumption of the at least one battery-powered device, based on the determination.

The computer-implemented method further includes transmitting the instructions for activating at least one of a functional mode and a sleep mode of the at least one battery-powered device to control the power consumption.

The computer-implemented method further includes transmitting an instruction to activate the sleep mode of the at least one battery-powered device, when the at least one battery-powered device is not positioned within the field of view of the camera. The at least one battery-powered device consumes substantially no power in the sleep mode.

The computer-implemented method further includes transmitting an instruction to activate the functional mode of the at least one battery-powered device, when the at least one battery-powered device is positioned within the field of view of the camera. The at least one battery-powered device consumes power in the functional mode.

The computer-implemented method further includes retrieving a position of at least one object within the field of view to be recorded by the camera, and a position of a second battery-powered device positioned at a remote location from the camera. The position of the second battery-powered device is predefined. The computer-implemented method includes comparing the pan angle and the tilt angle with positions of the first battery-powered device, the second battery-powered device, and the at least one object. The computer-implemented method includes determining whether the first battery-powered device or the second battery-powered device is positioned closer to the at least one object while staying within the field of view of the camera, based on the comparison. The computer-implemented method further includes transmitting instructions to simultaneously control power consumption of the first battery-powered device and the second battery-powered device, based on the determination.

BRIEF DESCRIPTION OF THE DRAWINGS

Non-limiting and non-exhaustive examples of the present teachings are described with reference to the following drawings. In the drawings, like reference numerals refer to like parts throughout the various figures unless otherwise specified. These drawings are not necessarily drawn to scale.

A more detailed understanding can be had from the following description, given by way of example in conjunction with the accompanying drawings wherein.

DETAILED DESCRIPTION

Figure 1:
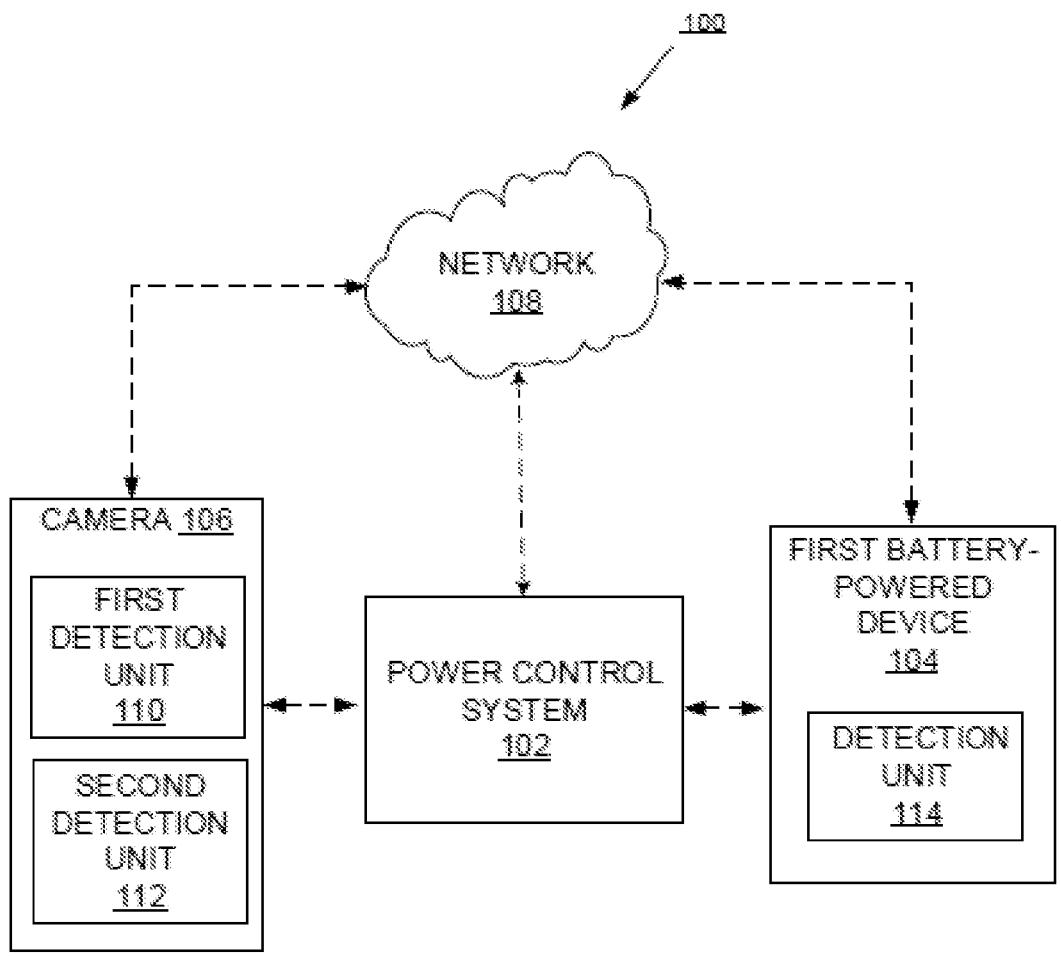
FIG. 1 illustrates an environment for implementation of a power control system for controlling operation of a battery-powered device positioned at a remote location from a camera, according to an embodiment of the present teachings.

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section.

In this description one or more systems and methods for controlling operation of at least one battery-powered device positioned at a remote location from a camera will be described in accordance with the present teachings. Although the overview is explained with respect to one of the systems of the present disclosure, the overview is equally applicable to other implementations, without departing from the scope of the present teachings.

In an embodiment, a power control system, hereinafter interchangeably referred to as system, for controlling operation of at least one battery-powered device positioned at a remote location from the camera is disclosed. The system may be configured to receive at least one of a pan angle and a tilt angle of the camera. The pan angle and the tilt angle may be indicative of a field of view of the camera. Further, the system may retrieve a position of the battery-powered device. The position of the battery-powered device is predefined.

The system may compare the pan angle and the tilt angle with the position of the battery-powered device. Based on the comparison, the system may determine whether the battery-powered device is positioned within the field of view of the camera. Further, the system may transmit instructions to control power consumption of the battery-powered device accordingly.

In one embodiment, the system may transmit instructions for activating at least one of an active mode and a sleep mode of the battery-powered device to control the power consumption. In the active mode, the battery-powered device consumes power. On the other hand, the battery-powered device may not consume power, or at least very little power, in the sleep mode.

In one embodiment, the system may determine that the battery-powered device is not positioned within the field of view. In such an embodiment, the system may transmit an instruction to activate the sleep mode of the battery-powered device. In another embodiment, when the system determines that the battery-powered device is positioned within the field of view, the system may transmit an instruction to activate the active mode of the battery-powered device.

Further, in case of multiple battery-powered devices operating in conjunction with the camera, the system may receive positions of each of the multiple battery-powered devices. Also, the system may receive a position of at least one object being recorded within the field of view. In such an embodiment, the system may determine one of the multiple battery-powered devices being positioned closer to the object in comparison to other battery-powered devices, while staying within the field of view of the camera. Further, the system may transmit an instruction to activate the active mode of determined battery-powered device and a sleep mode of the other battery-powered devices.

The system of the present disclosure offers a comprehensive approach of controlling the operation of the battery-powered devices. The system activates the active mode of a battery-powered device only when the battery-powered device is positioned within the field of view of the camera. Therefore, the battery-powered device is operational only when the camera is facing in a direction towards the battery-powered device. Activating the sleep mode of the battery-powered devices when the camera is not facing towards them assists in eliminating a possibility of wastage of power supply from batteries to operate the battery-powered devices when not required.

Further, the batteries do not have to be replaced or recharged as frequently as before and therefore, cost and inconvenience associated with maintenance of the batteries are significantly reduced. Also, the system can be implemented by making minor changes to the operation and construction of the camera. Therefore, the system offers flexibility in terms of implementation in an environment. In addition, the system can be implemented for controlling the operation of any battery-powered device that can work in conjunction with the camera. Therefore, the system has a wide range of application as well. As would be gathered, the present disclosure offers a comprehensive, flexible, accurate, effective, and economic approach for controlling the operation of the battery-powered devices positioned at remote locations of the camera.

FIG. 1 illustrates an environment 100 for implementation of a power control system 102, hereinafter referred to as system 102, for controlling operation of a first battery-powered device 104 positioned at a remote location from a camera 106, according to an embodiment of the present disclosure. The system 102, the first battery-powered device 104, and the camera 106 may be in communication with each other through a network 108. The network 108 may be a wired network or a wireless network.

The camera 106 may have a predefined field of view for recording activities occurring within the field of view. In an embodiment, the camera 106 may be a Pan-Tilt-Zoom (PTZ) camera. The camera 106 may include a first detection unit 110 and a second detection unit 112. The first detection unit 110 may detect a pan angle and a tilt angle of the camera 106 while recording the activities. The pan angle and the tilt angle are indicative of the field of view of the camera 106. Further, the camera 106 may also have a zoom functionality for zooming into any detail in the field of view. In one embodiment, the first detection unit 110 may include, but is not limited to, an angle sensor, a displacement sensor, and a controller of a stepping motor controlling the pan angle and the tilt angle of the camera 106.

Further, the second detection unit 112 may detect a position of at least one object (not shown) within the field of view to be recorded by the camera 106. The second detection unit 112 may detect the object, based on analysis of a video being recorded by the camera 106. In one embodiment, upon detection of the object, the second detection unit 112 may identify and categorize the object, based on predefined categories of objects. In one embodiment, the second detection unit 112 may be a Radio Detection and Ranging (RADAR) based unit.

Further, the first battery-powered device 104 may include, but is not limited to, a microphone, a temperature sensor, and a light emitting unit. The microphone may operate in conjunction with the camera 104 for recording audio of the activities. The temperature sensor may be configured to detect temperature of surroundings in case of temperature-sensitive operations. Further, the light emitting unit may be configured to illuminate area within the field of view of the camera 106.

In one embodiment, the first battery-powered device 104 may operate in a plurality of operational modes. The plurality of operational modes may include, but is not limited to, an active mode and a sleep mode. In the functional mode, the first battery-powered device 104 may consume power. Further, in the sleep mode, the first battery-powered device 104 may not consume power.

In one embodiment, the first battery-powered device 104 may include a detection unit 114 for detecting a position of the first battery-powered device 104. In one embodiment, the detection unit 114 may include, but is not limited to, a Global Positioning System (GPS). In another embodiment, the detection unit 114 may detect the position of the first battery-powered device 104, based on an image analysis of the video being recorded by the camera 106. In one embodiment, the position of the first batter-powered device 104 may be stored in a database (not shown), external or internal, of the system 102.

The pan angle and the tilt angle of the camera 106, the position of the object, and the position of the first battery-powered device 104 as detected by the first detection unit 110, the second detection unit 112, and the detection unit 114, respectively, may be received by the system 102. The system 102 may control the power consumption of the first battery-powered device 104 based on the abovementioned received information. In the present embodiment, the system 102 is shown as a separate component, and not integrated with the camera 106.

According to one embodiment the communication between the power control system 102 and the first battery powered device 104 may be performed using any common network technology, e.g. Ethernet, WiFi, or other LAN or wireless LAN technologies, when the battery-powered device 104 is in active mode. However, when the first battery-powered device 104 is in sleep mode this network capability is turned off in order to save power. However, in order to enable wake-up of the battery-powered device from the power control system 102 a communication protocol using very little energy in idle mode is implemented in both the power control system 102 and in the first battery powered device. Then, when the power control system is to wake up the battery powered device 104 this wake-up signal is sent to the battery-powered device 104 and the battery-powered device 104 go into active mode and start up the network connection. Examples of communication protocols using very little energy are Zigbee, Z-wave, Bluetooth LE, Thread, etc.

Figure 2:
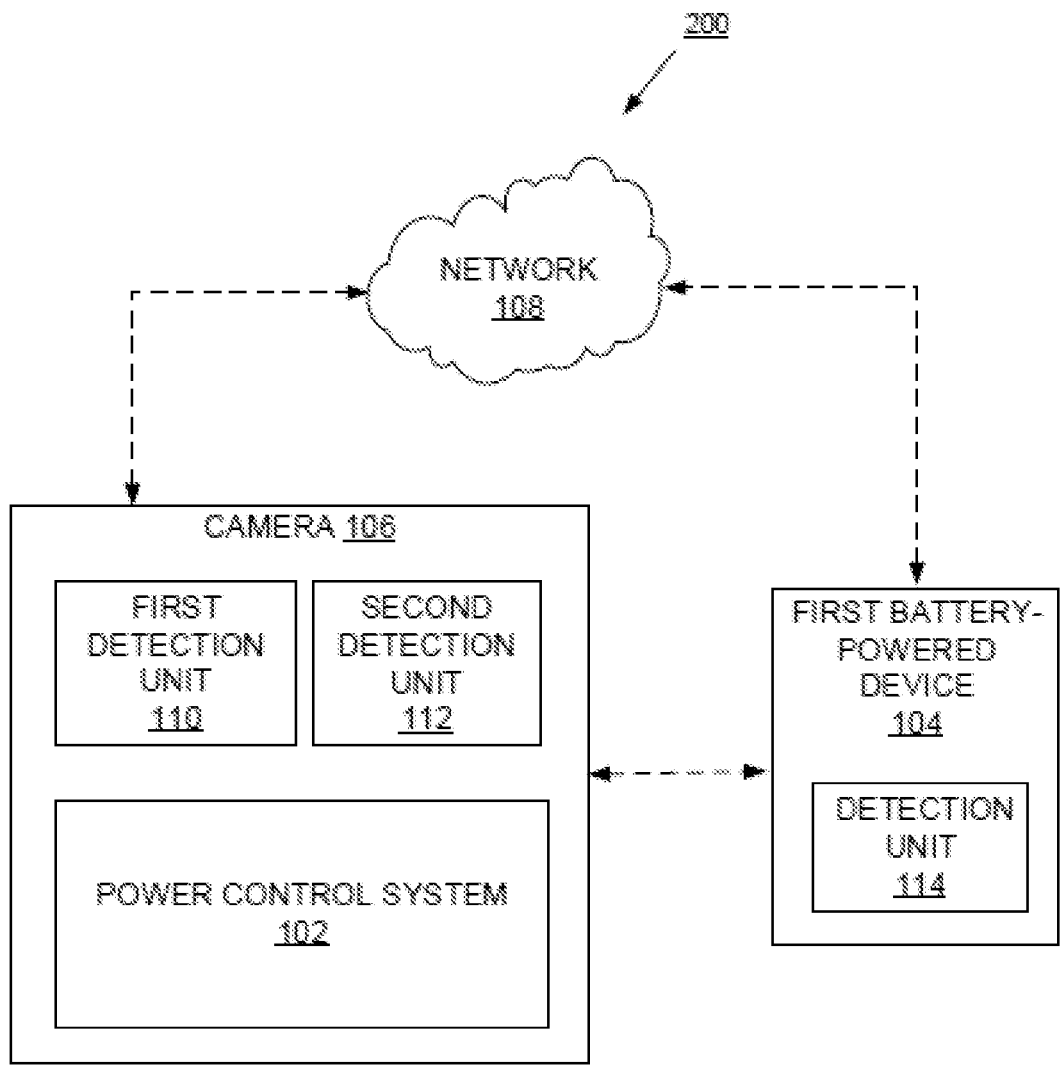
FIG. 2 illustrates another environment for implementation of the power control system for controlling the operation of the battery-powered device positioned at a remote location from the camera, according to an embodiment of the present teachings.

FIG. 2 illustrates an environment 200 where the system 102 is implemented in integration with the camera 106, according to an embodiment of the present disclosure. Therefore, the system 102 may be integrated with the camera 106 and operate as an in-built component of the camera 106. Referring to FIG. 1 and FIG. 2, in one embodiment, upon receiving the pan angle and the tilt angle of the camera 106 and the position of the first battery-powered device 104, the system 102 may operate the first battery-powered device 104 accordingly.

Figure 3:
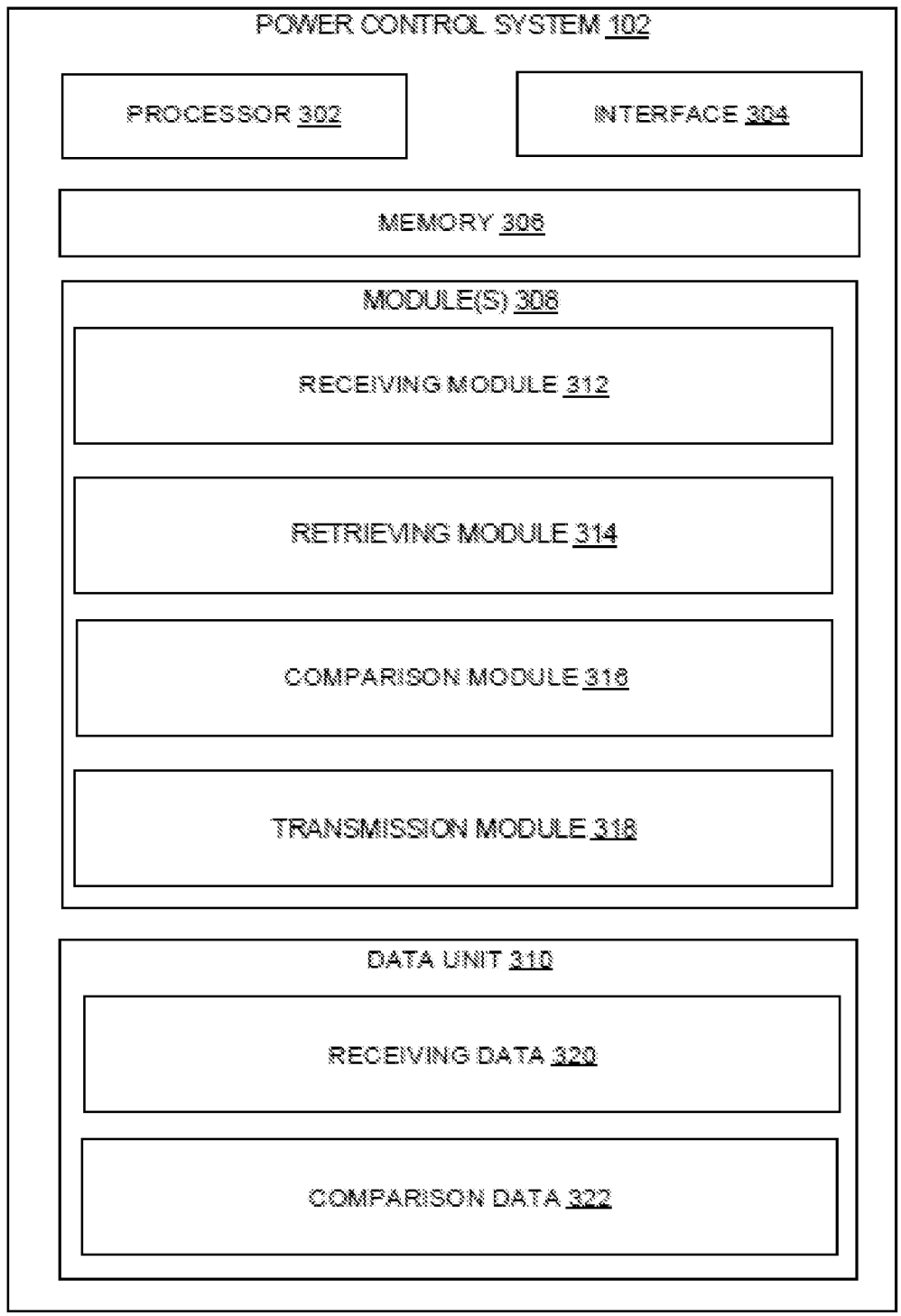
FIG. 3 illustrates a block diagram of the power control system, according to an embodiment of the present teachings.

FIG. 3 illustrates a block diagram of the system 102, according to an embodiment of the present disclosure. For the sake of brevity, the aspects of the present disclosure which are already explained in detail in the description of FIG. 1 and FIG. 2 are not explained in detail with regard to the description of the FIG. 3.

The system 102 may include a processor 302, an interface 304, and a memory 306 coupled to the processor 302. The processor 302 may be configured to fetch and execute computer readable instructions stored in the memory 306. In one embodiment, the processor 302 may be implemented as one or more microprocessors, microcomputers, microcontrollers, digital signal processors, central processing units, state machine, logic circuitries or any devices that manipulate signals based on operational instructions.

The interface 304 may facilitate multiple communications within wide variety of communication protocol(s) and network(s), including wired network(s) and/or wireless network(s). Further, the interface 304 may include a variety of software and hardware interfaces. In one embodiment, the interface 304 may include, but is not limited to, peripheral devices, such as a keyboard, a mouse, an external memory, and/or a printer.

In one embodiment, the memory 306 may include any non-transitory computer-readable medium. In one example, the non-transitory computer-readable medium may be a volatile memory, such as static random-access memory and a non-volatile memory, such as read-only memory, erasable programmable ROM, and flash memory.

The system 102 may further include modules 308 and a data unit 310. The modules 308 may include hardware and/or software, such as routines, programs, objects, components, and data structures, which perform particular tasks or implement particular data types, for example, with respect to controlling the power consumption of remotely arranged battery powered devices. In one embodiment, the modules 308 may include a receiving module 312, a retrieving module 314, a comparison module 316, and a transmission module 318. The data unit 310 may be included in a repository for storing data processed, received, and generated by one or more of the modules 308. The data unit 310 may include a receiving data unit 320 and a comparison data unit 322. The receiving module 312, the retrieving module 314, the comparison module 316, and the transmission module 318 may be in communication with each other.

The number of components of the system 102 shown in FIG. 3 is provided for explanatory purposes. In practice, the system 102 may include additional components, fewer components, different components, or differently arranged components than those shown in FIG. 3.

Referring to FIG. 1, FIG. 2, and FIG. 3, the system 102 is in communication with the camera 106 and the first battery-powered device 104. In one embodiment, the receiving module 312 may receive at least one of the pan angle and the tilt angle of the camera 106. In one embodiment, details pertaining to the receiving module 312 may be stored in the receiving data unit 320.

The retrieving module 314 may retrieve the position of the first battery-powered device 104. The position of the first battery-powered device 104 may be predefined, and stored in the database. In one embodiment, details pertaining to the retrieving module 314 may be stored in the receiving data unit 320.

Upon receiving the abovementioned information by the receiving module 312 and the retrieving module 314, the comparison module 316 may compare the pan angle and the tilt angle with the position of the first battery-powered device 104. According to alternative embodiments the comparison module compares either the pan angle or the tilt angle with the position of the first battery powered device 104. Based on the comparison, the comparison module 316 may determine whether the first battery-powered device 104 is positioned within the field of view of the camera 106.

Further, the transmission module 318 may transmit instructions to control the power consumption of the first battery-powered device 104, based on the determination. In one embodiment, the transmission module 318 may transmit the instructions for activating at least one of the active mode and the sleep mode of the first battery-powered device 104 to control the power consumption.

In one situation, the comparison module 316 may determine that the first battery-powered device 104 is not positioned within the field of view of the camera 106. In such a situation, the transmission module 318 may transmit an instruction to activate the sleep mode of the first battery-powered device 104. Therefore, since the camera 106 is not recording in the direction of the position of the first battery-powered device 104, the transmission module 318 may activate the sleep mode in order to save power in the battery-powered device.

In another situation, the comparison module 316 may determine that the battery-powered device 104 is positioned within the field of view of the camera 106. In one embodiment, details pertaining to the comparison module 316 may be stored in the comparison data 322. In such an situation, the transmission module 318 may transmit an instruction to activate the active mode of the first battery-powered device 104. Therefore, the first battery-powered device 104 consumes power when the camera 106 is recording in the direction of the position of the first battery-powered device 106. In one embodiment, details pertaining to the transmission module 318 may be stored in the comparison data 322.

Figure 4:
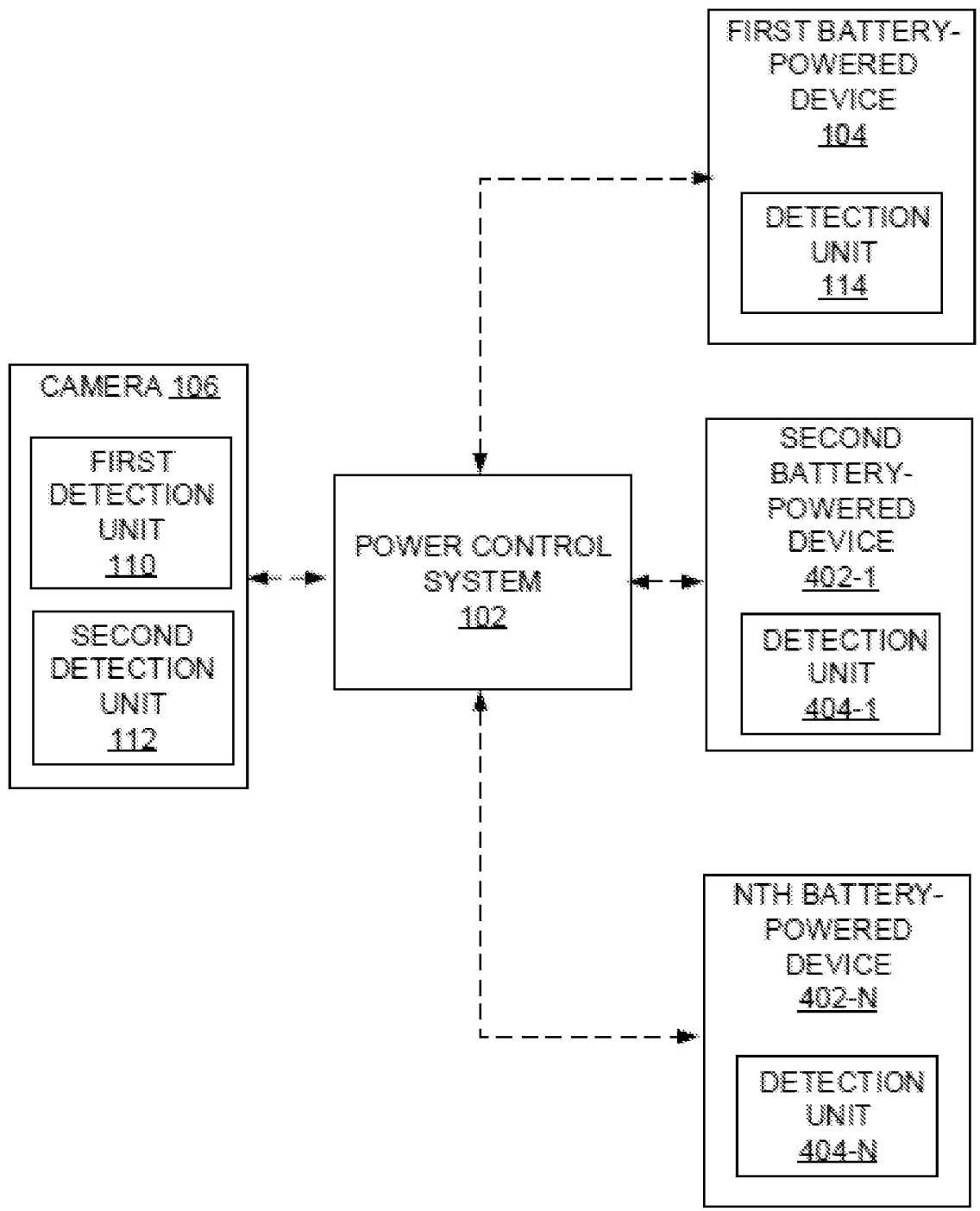
FIG. 4 illustrates an environment for implementation of a power control system for controlling operation of a plurality of battery-powered devices positioned at remote locations from the camera, according to an embodiment of the present teachings.

FIG. 4 illustrates an environment 400 for implementation of the system 102 for controlling operation of a plurality of battery-powered devices 402 positioned at remote locations from the camera 106, according to an embodiment of the present disclosure. The plurality of battery-powered devices 402 may individually be referred to as the first battery-powered device 104, a second battery-powered device 402-1, . . . and an nth battery-powered device 402-N.

For the sake of brevity and simplicity, the operation of the system 102 is explained with respect to control of the first battery-powered device 104 and the second battery-powered device 402-1, from among the plurality of battery-powered devices 402. The second battery-powered device 402-1 may be positioned at a remote location from the camera 106.

In the present embodiment, the receiving module 312 may receive the pan angle and the tilt angle of the camera 106. Further, the retrieving module 314 may retrieve the position of the object to be recorded by the camera 106, the position of the first battery-powered device 104, and a position of the second battery-powered device 402-1. The position of the second battery-powered device 402-1 may be predefined, and may be stored in the database.

The second battery-powered device 402-1 may also include a detection unit 404-1 for detecting its position. The constructional and operational features of the detection unit 404-1 may be similar to the detection unit 104 of the first battery-powered device 104.

Further, the comparison module 316 may compare the pan angle and the tilt angle with positions of the first battery-powered device 104, the second battery-powered device 402-1, and the object. Based on the comparison, the comparison module 316 may determine whether the first battery-powered device 104 or the second battery-powered device 402-1 is positioned closer to the object while staying within the field of view of the camera 106.

Further, the transmission module 318 may transmit instructions to simultaneously control power consumption of the first battery-powered device 104 and the second battery-powered device 402-1, based on the determination. In one situation, the comparison module 316 may determine that the first battery-powered device 104 is positioned closer to the object while staying within the field of view. In such an embodiment, the transmission module 318 may transmit an instruction to activate the functional mode of the first battery-powered device 104-1, and a sleep mode of the second battery-powered device 402-1.

In another situation, the comparison module 316 may determine that the second battery-powered device 402-1 is positioned closer to the object while staying within the field of view. In such an embodiment, the transmission module 318 may transmit an instruction to activate a functional mode of the second battery-powered device 402-1, and the sleep mode of the first battery-powered device 104.

Figure 5:
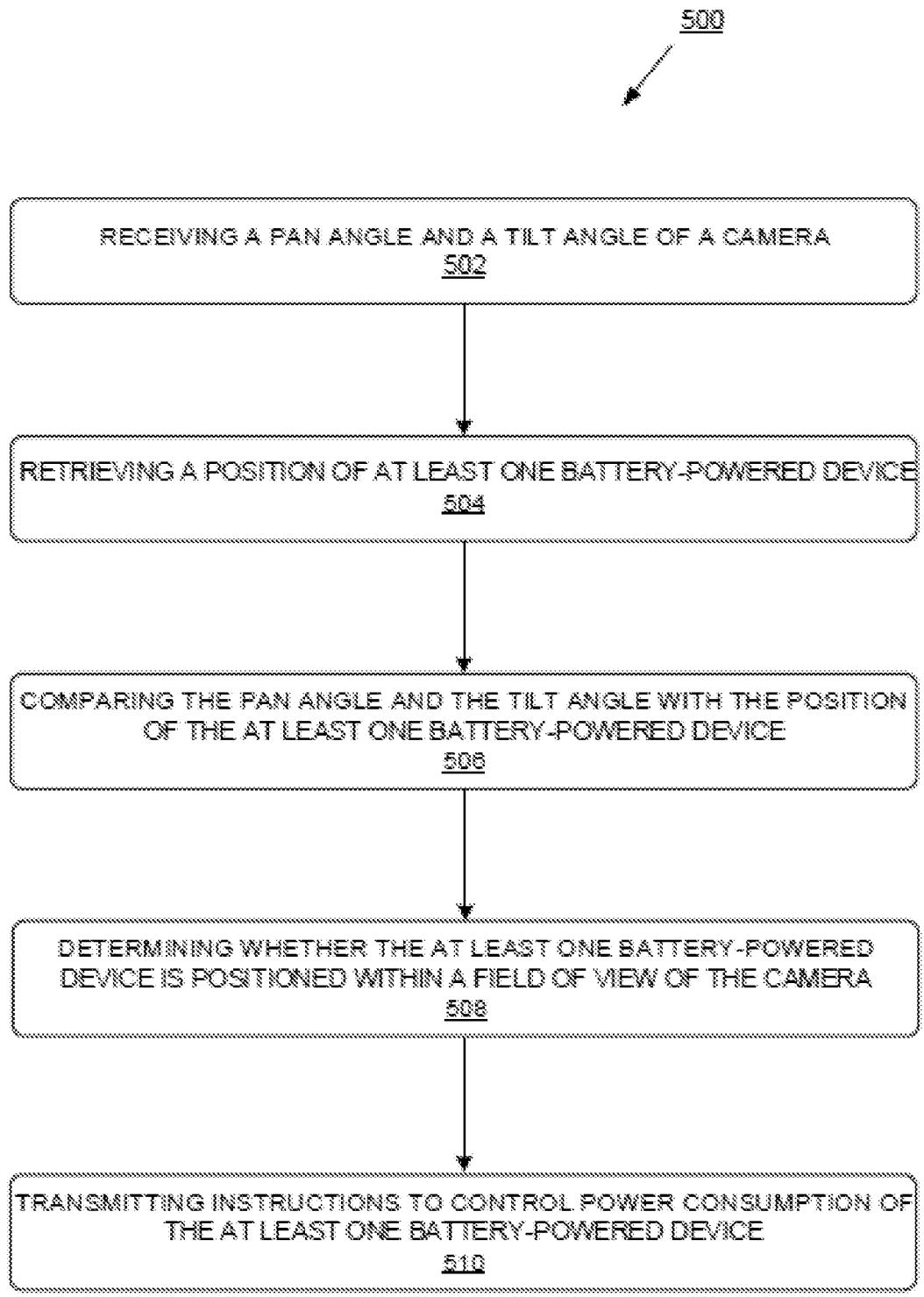
FIG. 5 illustrates a flowchart depicting a method for controlling the operation of the battery-powered device positioned at the remote location from the camera, according to an embodiment of the present disclosure.

FIG. 5 illustrates a flow chart depicting a method 500 for controlling the operation of the battery-powered device 104 positioned at a remote location from the camera 106, according to an embodiment of the present teachings. For the sake of brevity, constructional and operational aspects of the present teachings that are already disclosed in FIG. 1, FIG. 2, FIG. 3, and FIG. 4 are not explained in detail in the description of FIG. 5.

At block 502, the method 500 commences with receiving, by the system 102, the pan angle and the tilt angle of the camera 106. The pan angle and the tilt angle are indicative of the field of view of the camera 106. In one embodiment, the receiving module 312 of the system 102 may receive the pan angle and the tilt angle of the camera 106.

At block 504, the position of the battery-powered device 104, interchangeably referred to as the first battery-powered device 104, may be retrieved by the system 102. The position of the battery-powered device 104 is predefined. In one embodiment, the retrieving module 314 of the system 102 may retrieve the position of the battery-powered device 104.

At block 506, the method 500 includes comparing, by the system 102, the pan angle and the tilt angle of the camera 106 with the position of the battery-powered device 104. In one embodiment, the comparison module 316 of the system 102 may compare the pan angle and tilt angle with the position of the battery-powered device 104.

At block 508, the method 500 includes determining, by the system 102, whether the battery-powered device 104 is positioned within the field of view of the camera 106, based on the comparison. In one embodiment, the comparison module 316 of the system 102 may determine whether the battery-powered device 104 is positioned within the field of view.

At block 510, the method 500 includes transmitting, by the system 102, the instructions to control the power consumption of the battery-powered device 104, based on the determination. In one embodiment, the instructions may be transmitted for activating at least one of the active mode and the sleep mode of the battery-powered device 104 to control the power consumption. The transmission module 318 of the system 102 may transmit the instructions to control the power consumption of the battery-powered device 104.

In an embodiment, the method 500 includes transmitting the instruction to activate the sleep mode of the battery-powered device 104, when the battery-powered device 104 is not positioned within the field of view of the camera 106. The battery-powered device 104 may not consume power, or at least consume very little power, in the sleep mode.

In another embodiment, the method 500 includes transmitting the instruction to activate the functional mode of the battery-powered device 104, when the battery-powered device 104 is positioned within the field of view of the camera 106. The battery-powered device 104 consumes power in the active mode.

Figure 6:
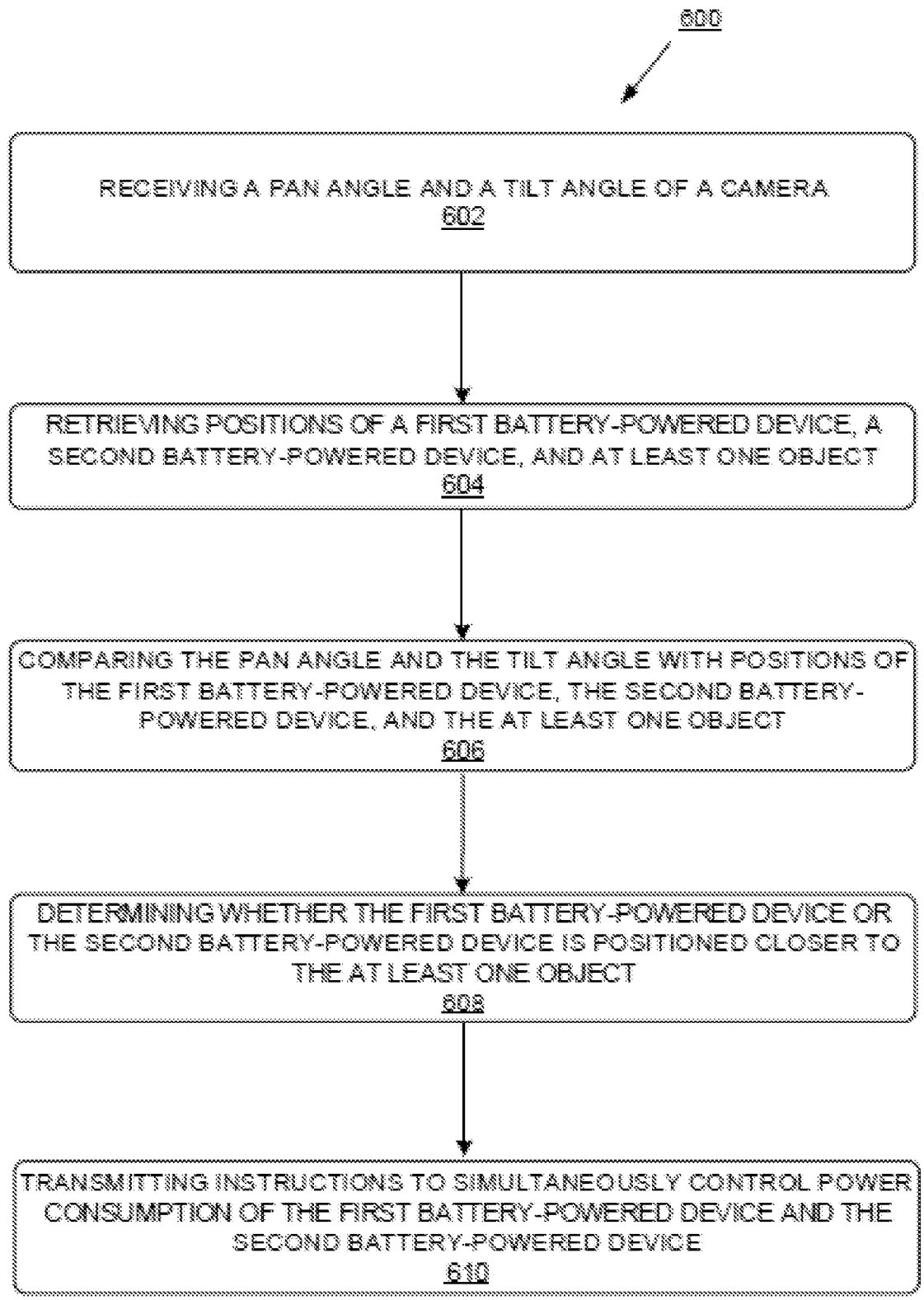
FIG. 6 illustrates a flowchart depicting a method for controlling the operation of the plurality of battery-powered devices positioned at remote locations from the camera, according to an embodiment of the present teachings.

FIG. 6 illustrates a flow chart depicting a method 600 for controlling the operation of the plurality of battery-powered devices 402 positioned at remote locations from the camera 106, according to an embodiment of the present disclosure. For the sake of brevity, constructional and operational aspects of the present disclosure that are already disclosed in FIG. 1, FIG. 2, FIG. 3, FIG. 4, and FIG. 5 are not explained in detail in the description of FIG. 6.

At block 602, the method 600 commences with receiving, by the system 102, the pan angle and the tilt angle of the camera 106. In one embodiment, the receiving module 312 of the system 102 may receive the pan angle and the tilt angle of the camera 106.

At block 604, the method 600 includes retrieving, by the system 102, the positions of the first battery-powered device 104, the second battery-powered device 402-1, and the object. In one embodiment, the retrieving module 314 of the system 102 may retrieve the positions of the first battery-powered device 104, the second battery-powered device 402-1, and the object.

At block 606, the method 600 includes comparing the pan angle and the tilt angle with the positions of the first battery-powered device 104, the second battery-powered device 402-1, and the object. In one embodiment, the comparison module 316 of the system 102 may compare the pan angle and tilt angle with the positions of the first battery-powered device 104, the second battery-powered device 402-1, and the object.

At block 608, the method 600 includes determining whether the first battery-powered device 104 or the second battery-powered device 402-1 is positioned closer to the object while staying within the field of view of the camera 106, based on the comparison. In one embodiment, the comparison module 316 of the system 102 may determine whether the first battery-powered device 104 or the second battery-powered device 402-1 is positioned closer to the object.

At block 610, the method 600 includes transmitting the instructions to simultaneously control the power consumption of the first battery-powered device 104 and the second battery-powered device 402-1, based on the determination. The transmission module 318 of the system 102 may transmit the instructions to simultaneously control the power consumption of the first battery-powered device 104 and the second battery-powered device 402-1.

Although the present disclosure is explained with regard to implementation of the power control system 102 in the PTZ camera 106, the power control system 102 can also be implemented in a camera implementing digital PTZ as well, without departing from the scope of the present disclosure. A camera implementing digital PTZ functionality, may include a wide-angle lens, for example, fisheye. The fisheye may then be cropped for display of the field of view. In one embodiment, the cropped portion of the fisheye may be de-warped before being recorded.

Also, the power control system 102 may be implemented for applications external to the camera 106, for example, a Video managing system or in a general control system, without departing from the scope of the present disclosure.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims and their equivalents in which all terms are meant in their broadest reasonable sense unless otherwise indicated.

What is claimed is:

1. A power control system for controlling operation of a battery-powered device positioned at a remote location from a camera, the power control system comprising:
   a receiving module configured to receive at least one of a pan angle and a tilt angle of the camera, wherein at least one of a pan angle and a tilt angle is indicative of a field of view of the camera;
   a retrieving module configured to retrieve a position of the battery-powered device, wherein the position of the battery-powered device is predefined;
   a comparison module, in communication with the receiving module and the retrieving module, configured to:
   compare the at least one of a pan angle and a tilt angle with the position of the battery-powered device; and
   based on the comparison, determine whether the battery-powered device is positioned within the field of view of the camera; and
   a transmission module, in communication with the comparison module, configured to transmit instructions to activate at least one of a functional mode and a sleep mode of the battery-powered device, wherein the battery-powered device consumes less power in the sleep mode than in the functional mode,
   wherein the transmission module is configured to transmit an instruction to activate the sleep mode of the battery-powered device, when the battery-powered device is not positioned within the field of view of the camera,
   wherein the transmission module is configured to transmit an instruction to activate the functional mode of the battery-powered device, when the battery-powered device is positioned within the field of view of the camera, and
   wherein the battery-powered device comprises one or more of a microphone, a temperature sensor, and a light emitting unit, wherein the microphone operates in conjunction with the camera for recording audio of the activities monitored by the camera, wherein the temperature sensor is configured to detect temperature of surroundings in case of temperature-sensitive operations of the camera, wherein the light emitting unit is configured to illuminate an area within the field of view of the camera.

2. The power control system of claim 1, wherein the camera is a Pan-Tilt-Zoom (PTZ) camera.

3. The power control system of claim 1, wherein the power control system is included in the camera.

4. A method of controlling operation of at least one battery-powered device positioned at a remote location from a camera, the method comprising:
   receiving at least one of a pan angle and a tilt angle of a camera positioned at a remote location from the battery-powered device, wherein the at least one of a pan angle and a tilt angle are indicative of a field of view of the camera;
   retrieving a position of the battery-powered device, wherein the position of the battery-powered device is predefined;
   comparing the at least one of a pan angle and a tilt angle of the camera with the position of the battery-powered device;
   determining based on the comparison, whether the battery-powered device is positioned within the field of view of the camera; and
   transmitting based on the determination, instructions for activating at least one of a functional mode and a sleep mode of the battery-powered device, wherein the battery-powered device consumes less power in the sleep mode than in the functional mode,
   wherein an instruction to activate the sleep mode of the battery-powered device is transmitted when the battery-powered device is not positioned within the field of view of the camera, and
   wherein an instruction to activate the functional mode of the battery-powered device is transmitted when the battery-powered device is positioned within the field of view of the camera,
   wherein the battery-powered device comprises one or more of a microphone, a temperature sensor, and a light emitting unit, wherein the microphone operates in conjunction with the camera for recording audio of the activities monitored by the camera, wherein the temperature sensor is configured to detect temperature of surroundings in case of temperature-sensitive operations of the camera, wherein the light emitting unit is configured to illuminate an area within the field of view of the camera.

5. A method for controlling operation of a first battery-powered device and a second battery-powered device both positioned at a remote location from a camera, the method comprising:
   receiving at least one of a pan angle and a tilt angle of a camera, wherein the at least one of a pan angle and a tilt angle of the camera is indicative of a field of view of the camera;

retrieving a position of an object within the field of view to be recorded by the camera;

retrieving a position of a first battery-powered device, wherein the position of the first battery-powered device is predefined;

retrieving a position of the second battery-powered device, wherein the position of the second battery-powered device is predefined;

comparing the at least one of a pan angle and a tilt angle of the camera with the position of the first battery-powered device, with the position of the second battery-powered device, and with the position of the object;

while the first battery-powered device, the second battery-powered device, and the object are within the field of view of the camera, determining which one of the first battery-powered device and the second battery-powered device is positioned closest to the object; and transmitting instructions to simultaneously control of the battery-powered device and the second battery-powered device wherein an instruction to activate a functional mode of the battery-powered device is transmitted to the battery-powered device, among the first and second battery-powered devices, that is positioned closest to the object, wherein an instruction to activate a sleep mode of the battery-powered device is transmitted to the other battery-powered device among the first and second battery-powered devices, and wherein each battery-powered device consumes less power in the sleep mode than in the functional mode wherein each one of the first battery-powered device and the second battery-powered device comprises one or more of a microphone, a temperature sensor, and a light emitting unit, wherein the microphone operates in conjunction with the camera for recording audio of the activities monitored by the camera, wherein the temperature sensor is configured to detect temperature of surroundings in case of temperature-sensitive operations of the camera, wherein the light emitting unit is configured to illuminate an area within the field of view of the camera.

6. A power control system for controlling operation of a battery-powered device and a second battery-powered device both positioned at a remote location from a camera, the power control system comprising:

a receiving module configured to receive at least one of a pan angle and a tilt angle of the camera, wherein the at least one of a pan angle and a tilt angle is indicative of a field of view of the camera;

a retrieving module configured to:

retrieve a position of the first battery-powered device, wherein the position of the first battery-powered device is predefined, retrieve a position of an object within the field of view to be recorded by the camera, and retrieve a position of the second battery-powered device, wherein the position of the second battery-powered device is predefined;

a comparison module, in communication with the receiving module and the retrieving module, configured to:

compare the at least one of a pan angle and a tilt angle of the camera with the position of the first battery-powered device, with the position of the second battery-powered device, and with the position of the object, and while the first battery-powered device, the second battery-powered device and the object are within the field of view of the camera, determine which one of the first battery-powered device and the second battery-powered device that is positioned closest to the object; and a transmission module, in communication with the comparison module, configured to transmit instructions to simultaneously control the first battery-powered device and the second battery-powered device, wherein the transmission module is further configured to transmit an instruction to activate a functional mode of the battery-powered device to the battery-powered device, among the first and second battery-powered devices, that is positioned closest to the object, and to transmit an instruction to activate a sleep mode of the battery-powered device to the other battery-powered device among the first and second battery-powered devices, wherein the battery-powered device consumes less power in the sleep mode than in the functional mode, wherein each one of the first and second battery-powered devices comprises one or more of a microphone, a temperature sensor, and a light emitting unit, wherein the microphone operate in conjunction with the camera for recording audio of the activities monitored by the camera, wherein the temperature sensor is configured to detect temperature of surroundings in case of temperature-sensitive operations of the camera, wherein the light emitting unit is configured to illuminate an area within the field of view of the camera.

7. The power control system as claimed in claim 6, wherein the camera is a Pan-Tilt-Zoom camera.

8. The power control system of claim 6, wherein the power control system is included in the camera.

* * * * *